US012104797B2

(12) United States Patent
Balekundri

(10) Patent No.: US 12,104,797 B2
(45) Date of Patent: Oct. 1, 2024

(54) COOKING APPLIANCE PROVIDED WITH A DOOR LATCH ASSEMBLY

(71) Applicant: Whirlpool EMEA S.p.A., Pero (IT)

(72) Inventor: Abubackar M. Balekundri, Karnataka (IN)

(73) Assignee: Whirlpool Corporation, Benton Harbor, MI (US)

( * ) Notice: Subject to any disclaimer, the term of this patent is extended or adjusted under 35 U.S.C. 154(b) by 327 days.

(21) Appl. No.: 17/486,438

(22) Filed: Sep. 27, 2021

(65) Prior Publication Data

US 2022/0099306 A1 Mar. 31, 2022

(30) Foreign Application Priority Data

Sep. 30, 2020 (EP) .................................... 20199472

(51) Int. Cl.
*F24C 15/02* (2006.01)
*E05C 19/02* (2006.01)
*E05C 19/06* (2006.01)

(52) U.S. Cl.
CPC ............ *F24C 15/022* (2013.01); *E05C 19/02* (2013.01); *E05C 19/06* (2013.01); *E05Y 2900/30* (2013.01)

(58) Field of Classification Search
CPC ........ Y10S 292/69; E05C 17/52; E05C 19/02; E05C 19/06; E05C 2009/1816; F24C 15/02; F24C 15/022; F24C 15/04; F24C 15/045
See application file for complete search history.

(56) References Cited

U.S. PATENT DOCUMENTS 1,551,211 A * 8/1925 Page ........................ E05C 19/02 126/214 R
2,451,591 A * 10/1948 Tinnerman .............. F16B 5/128 24/453

(Continued)

FOREIGN PATENT DOCUMENTS

DE 8137042 U 3/1982
DE 202004003027 U1 * 8/2004 ........... A47B 88/047

(Continued)

OTHER PUBLICATIONS

Espacenet machine translation of JPH0439526A, generated Sep. 28, 2023 (Year: 2023).*

(Continued)

*Primary Examiner* — Kristina R Fulton
*Assistant Examiner* — Emily G. Brown
(74) *Attorney, Agent, or Firm* — Price Heneveld LLP

(57) ABSTRACT

A cooking appliance includes at least a muffle defining a cooking cavity, a frame and a door hinged to the frame. An aperture is provided in the frame for gaining access to the cooking cavity, the door allowing the aperture to be selectively opened and closed by means of a rotation of the door around a rotation axis. The cooking appliance further includes a latch assembly configured to establish a releasable engagement between the frame and the door when the door is in the closed position. The latch assembly includes a latch member and a latch receiver. One of the latch member and the latch receiver is integral to an insert coupled to the door and is applied adjacently to a first side of the door, the first side of the door being the side of the door farthest from the rotation axis.

19 Claims, 5 Drawing Sheets

(56) References Cited

U.S. PATENT DOCUMENTS

| | | | | |
|---|---|---|---|---|
| 3,045,663 | A | 7/1962 | McDonnold | |
| 3,592,495 | A * | 7/1971 | Fisher | D06F 39/12 292/76 |
| 3,777,098 | A * | 12/1973 | Tapper | H05B 6/6417 292/DIG. 68 |
| 4,136,667 | A | 1/1979 | Lewis | |
| 4,623,179 | A * | 11/1986 | Davis | D06F 37/42 292/201 |
| 6,406,071 | B1 * | 6/2002 | LaViola | E05B 3/00 292/87 |
| 7,066,503 | B2 | 6/2006 | Smith et al. | |
| 8,246,089 | B2 * | 8/2012 | Mueller | D06F 37/42 292/341.15 |
| 9,924,850 | B2 * | 3/2018 | Park | A47L 15/4225 |
| 2006/0001273 | A1 * | 1/2006 | Smith | F24C 15/022 292/204 |
| 2008/0036217 | A1 * | 2/2008 | Wang | E05C 19/02 292/146 |
| 2017/0059177 | A1 * | 3/2017 | Yancey | B21D 39/032 |
| 2021/0302026 | A1 * | 9/2021 | Jeong | F24C 15/08 |
| 2022/0074599 | A1 * | 3/2022 | Sevgen | F24C 15/045 |

FOREIGN PATENT DOCUMENTS

| | | | | |
|---|---|---|---|---|
| DE | 102007029901 | A1 | 1/2009 | |
| EP | 1030116 | A2 | 8/2000 | |
| EP | 1235034 | A2 * | 8/2002 | F24C 15/022 |
| EP | 2072722 | A2 * | 6/2009 | E05C 19/028 |
| EP | 2532973 | B1 | 11/2017 | |
| EP | 3546835 | A1 | 10/2019 | |
| GB | 2309045 | B | 7/1998 | |
| GB | 2354795 | A * | 4/2001 | E05C 19/063 |
| JP | H0439526 | A * | 2/1992 | |
| JP | H04039526 | A | 2/1992 | |
| KR | 950013653 | B1 * | 11/1995 | |
| WO | 2018109590 | A1 | 6/2018 | |

OTHER PUBLICATIONS

Espacenet machine translation of EP 2072722 A2, generated Feb. 29, 2024 (Year: 2024).*

* cited by examiner

COOKING APPLIANCE PROVIDED WITH A DOOR LATCH ASSEMBLY

CROSS REFERENCE TO RELATED APPLICATION

The present application claims priority to European Patent Application No. 20199472.0, entitled COOKING APPLIANCE PROVIDED WITH A DOOR LATCH ASSEMBLY, which was filed on Sep. 30, 2020, the entire contents of which are hereby incorporated by reference.

BACKGROUND OF THE DISCLOSURE

The present disclosure generally relates to a cooking appliance door latch assembly, and, more specifically, to a door latch assembly for an oven.

Cooking appliances, such as ovens and ranges, are typically provided with a muffle that defines a cooking cavity and a frame which includes an aperture for gaining access to the cooking cavity. Typically, the cooking cavity is closed by a door, which is hinged to the frame and which may be provided with a handle for allowing a user to easily grasp the door. The door allows the aperture to be selectively opened and closed relative to the frame. The door may be provided with a plurality of panes, in particular with a front pane and a rear pane, which face the muffle when the door is closed. For releasably securing the door to the frame, cooking appliances may be provided with latch assemblies that, when the door is in the closed position, establish a releasable engagement between the frame and the door.

Latch assemblies typically include a latch member and a latch receiver, the latch receiver is configured to removably accommodate at least a part of the latch member. Conventional latch assemblies may include latch members configured to releasably couple with corresponding latch receivers that significantly protrude from a door. Being distinctly visible by the user (even when the door is closed), makes the aesthetic aspect of the cooking appliance significantly less pleasant.

Additionally, conventional latch assemblies have complex structures, which are expensive to produce and may be prone to malfunctions. An example of a structurally complex latch assembly is disclosed by U.S. Pat. No. 7,066,503 B2, which discloses a motorized door latch assembly for locking an oven door in a locked and sealed position for cleaning the oven. Further, conventional latch assemblies may be provided with latch receivers having one or more small recesses (e.g. on the internal surface of the door) that may be prone to accumulate dirt and can become difficult to clean.

SUMMARY OF THE DISCLOSURE

According to one aspect of the present disclosure, a cooking appliance includes a muffle defining a cooking cavity, a frame defining an aperture accessing the cooking cavity, a door configured to selectively cover the aperture by rotation of the door around a rotation axis and a latch assembly configured to establish a releasable engagement between the frame and the door. The latch assembly includes a latch member including an engagement portion having a ridged portion, a latch receiver including a protrusion, and an insert removably coupled to the door. The insert includes a snap coupler configured to secure the insert to the door, wherein one of the latch member and the latch receiver is integral to the insert.

According to another aspect of the present disclosure, a cooking appliance includes a muffle defining a cooking cavity, a frame defining an aperture accessing the cooking cavity, a door configured to selectively cover the aperture by rotation of the door around a rotation axis, and a latch assembly configured to establish a releasable engagement between the frame and the door. The latch assembly includes a flexible latch member including an engagement portion having a ridged portion and a latch receiver including a protrusion, wherein one of the latch member and the latch receiver is coupled to the door and the other one of the latch member and the latch receiver is coupled to the frame and the latch assembly does not extend beyond an outer wall of the door.

According to yet another aspect of the present disclosure, a method of installing a latch assembly on a cooking appliance includes the steps of: installing one of a latch member and a latch receiver on a frame adjacent to a side of an access opening farthest from a rotation axis V and installing the other one of the latch member and the latch receiver on a door, the other one of the latch member and the latch receiver being integral to an insert removably coupled to the door, adjacent to a side of the door farthest from the rotation axis V, wherein installing the other one of the latch member and the latch receiver on the door includes displacement of the insert until a flap on the insert is received within an opening in a structural element of the door.

These and other features, advantages, and objects of the present disclosure will be further understood and appreciated by those skilled in the art by reference to the following specification, claims, and appended drawings.

Figure 1:
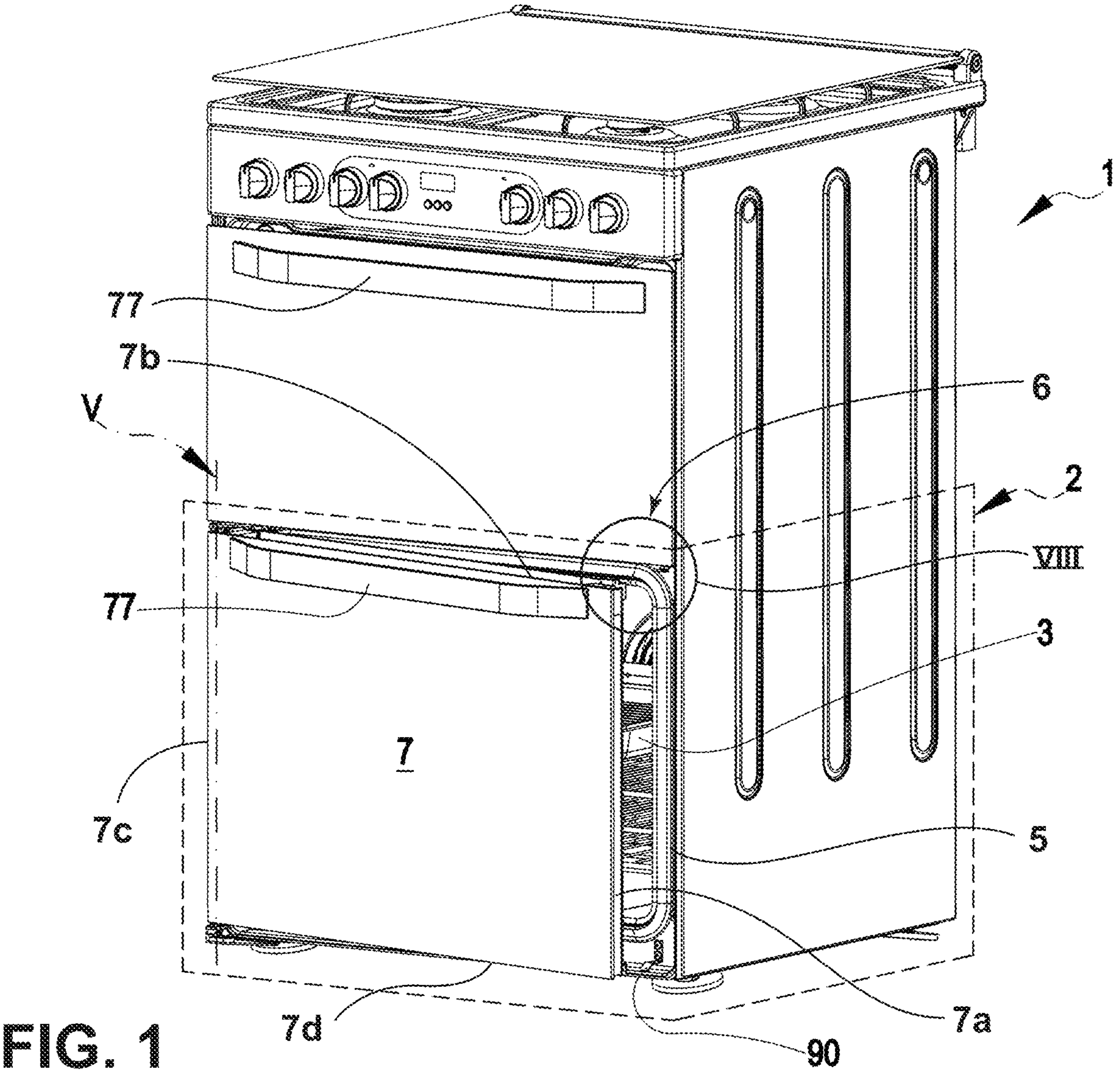
FIG. 1 is a perspective view of a cooking appliance according to various aspects described herein.

The components in the figures are not necessarily to scale, emphasis instead being placed upon illustrating the principles described herein.

DETAILED DESCRIPTION

The present illustrated embodiments reside primarily in combinations of method steps and apparatus components related to a cooking appliance door push button assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-4 and 8, reference numeral 1 generally designates a cooking appliance. The cooking appliance 1 may include a muffle 2 defining a cooking cavity 3, a frame 5 defining an aperture 4 accessing the cooking cavity 3, a door 7 configured to selectively cover the aperture 4 by rotation of the door 7 around a rotation axis V, and a latch assembly 6 configured to establish a releasable engagement between the frame 5 and the door 7. The latch assembly 6 may include a latch member 9 including an engagement portion 9*e* having a ridged portion 9*r*, a latch receiver 8 including a protrusion 10, and an insert 25 removably coupled to the door 7. The insert 25 may include a snap coupler 13 configured to secure the insert 25 to the door 7 and one of the latch member 9 and the latch receiver 8 is integral to the insert 25.

The cooking appliance 1 is suitable to be installed in a kitchen and may be in the form of an oven. The illustrated cooking appliance 1 is depicted as a double oven range. However, it is within the scope of various aspects described herein for the cooking appliance 1 to include any appliance and is not limited to an oven.

Referring to FIG. 1, the cooking appliance 1 includes a cabinet, or muffle 2 defining the cooking cavity 3 wherein food may be cooked and the frame 5 that is provided with the aperture 4 for accessing the cooking cavity 3. Inside the cooking cavity 3, at least one and preferably a plurality of heating elements may be provided for heating the cooking cavity 3. The heating elements may be electrically powered and/or fuel (e.g. gas) powered. When several heating elements are provided, those heating elements may be selectively activated and/or the generated heat power may be selectively controlled by one or more control elements.

The cooking appliance 1 further includes the door 7, which may be hinged to the frame 5. The door 7 may be a swing door, i.e. a door which is hinged to the frame 5 at one side thereof in order to rotate with respect to the frame 5. The door 7 may rotate around the rotation axis V which may be arranged vertically, as shown in FIG. 1 (or, similarly, as shown in FIG. 9, horizontally). FIG. 1 shows that the rotation axis V (around which the door 7 is pivoted) may be vertical and adjacent to a lateral side of the door 7, while FIG. 9 shows that the rotation axis V may be horizontal and adjacent to the bottom side of the door 7. It shall be noted that all teachings provided herewith (making particular reference to FIGS. 2 to 8) apply equally to the embodiment of FIG. 1, i.e. to the embodiment wherein the rotation axis V is vertical, and to the embodiment of FIG. 9, i.e. to the embodiment wherein the rotation axis V is horizontal unless explicitly stated otherwise. Further, it is within the scope of aspects described herein for the door 7 to be in any form, such as a sliding door.

In a closed position, the door 7 may be substantially in close contact and/or at least partially in contact with the frame 5 to seal the cooking cavity 3 and prevent heat loss during cooking of food. In the closed position, the door 7 is releasably engaged to the frame 5. In an open position, which is illustrated in FIG. 1, the door 7 is at least partially detached from the frame 5 to provide a user access to the cooking cavity 3. In a fully open position, the door 7 is not in contact with the frame 5 except for at the hinging points. In this way, the door 7 selectively covers the aperture 4, which may be in the form of an access opening.

Figure 2:
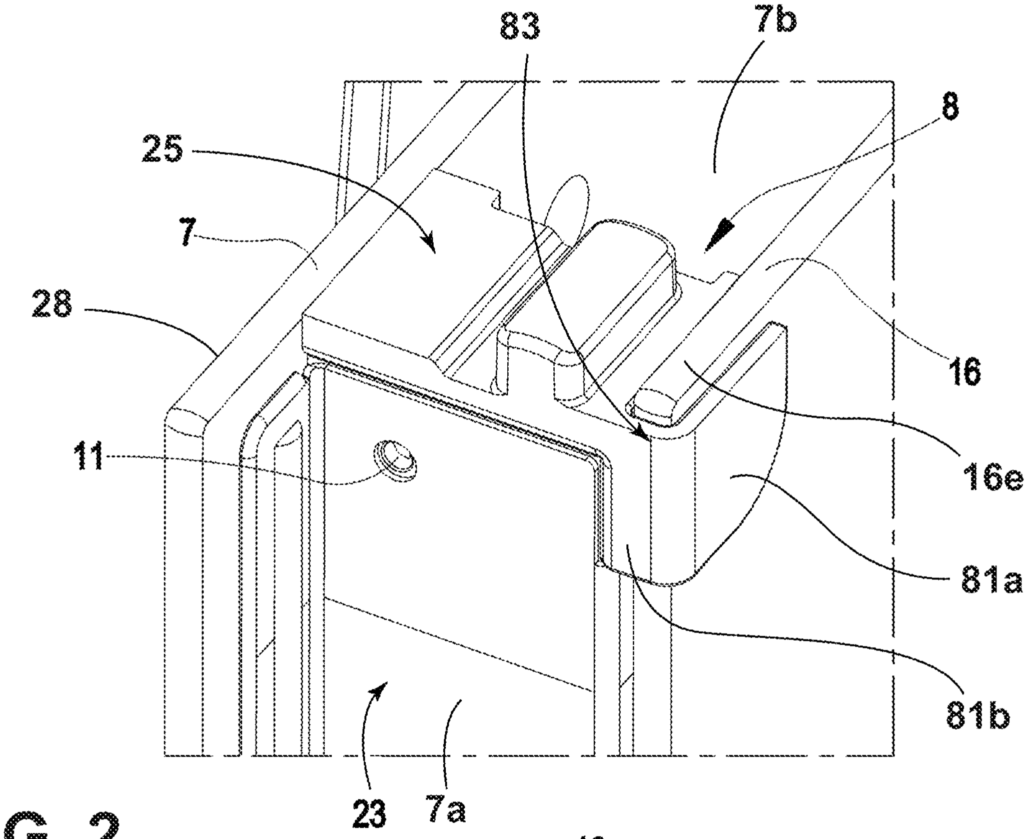
FIG. 2 is a top perspective view of a portion of a door of the cooking appliance illustrating a latch receiver arranged near an edge of the door according to various aspects described herein.

The door 7 may be provided with at least one glass pane configured to allow the user to see into the cooking cavity 3. The glass pane may be transparent or partly darkened and configured to withstand heat generated from the cooking appliance 1. In some examples, the door 7 includes two or more glass panes substantially parallel to each other and spaced to form an insulation gap, e.g., between the glass panes. As illustrated in FIG. 2, the cooking appliance 1 includes an external glass 28 and an internal glass 16. The illustrated glasses 16, 28 of the door 7 have two sides that extend in a direction that is substantially parallel to the rotation axis V and two sides that extend in a direction that is substantially orthogonal to the rotation axis V. In this way, the four sides may form a generally rectangular shape.

Figure 8:
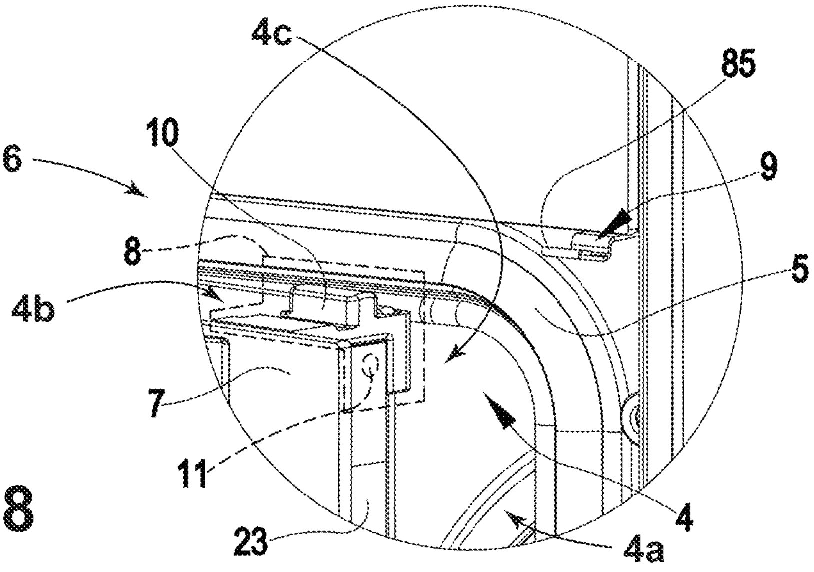
FIG. 8 is an enlarged view of area VIII of the cooking appliance of FIG. 1 showing the latch assembly according to various aspects described herein.
Figure 9:
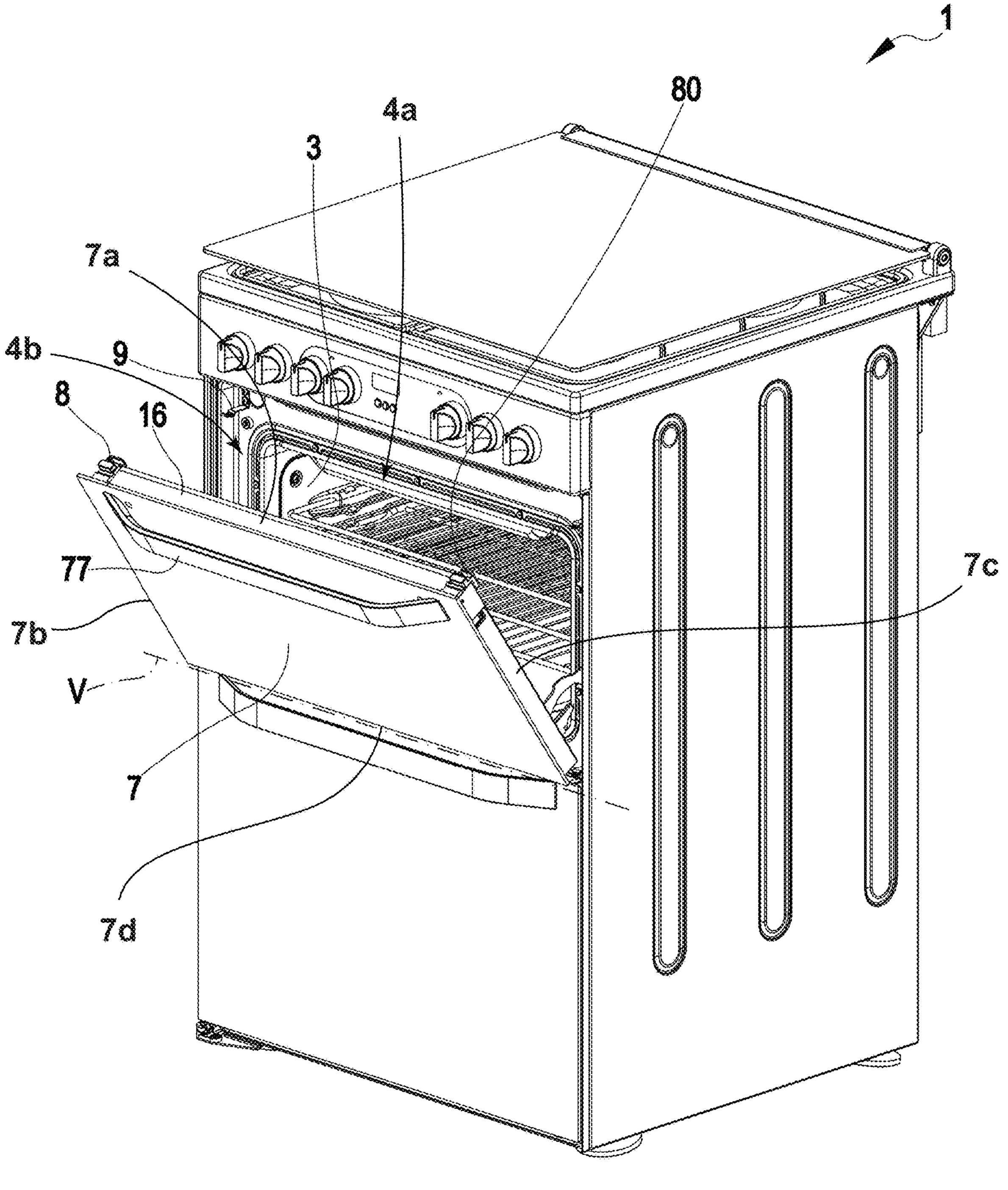
FIG. 9 is a top perspective view of another cooking appliance according to various aspects described herein.

Referring to FIG. 8, the cooking appliance 1 according to the present disclosure is provided with the latch assembly 6 which is configured to establish a releasable engagement between the frame 5 and the door 7 when the door 7 is in the closed position. The latch assembly 6 may be a passive latch assembly, such that the latch assembly 6 does not require an external power source (in particular, an electric power source) to operate, but is not limited to such.

As illustrated in FIG. 8, the latch assembly 6 includes the latch receiver 8 and the latch member 9 having respective engagement portions 8*e*, 9*e*. According to various aspects described herein, in the cooking appliance 1, one of the latch receiver 8 and the latch member 9 is coupled to the frame 5 adjacent to a first side 4*a* of the aperture 4. FIG. 8 illustrates the latch member 9 coupled to the frame 5. The first side 4*a* in particular is the side of the aperture 4, which is farthest from the rotation axis V of the door and may be a horizontal side of the aperture 4 (as in FIG. 9) or a vertical side of the aperture 4 (as in FIG. 1).

Accordingly, a process of assembling the cooking appliance 1 includes providing the cooking appliance 1 with the latch assembly 6 having the latch member 9 and the latch receiver 8 and installing one of the latch member 9 and the latch receiver 8 on the frame 5 adjacent to the first side 4*a* of the aperture 4 which is farthest from the rotation axis V. The process also includes a step of installing the other of the latch receiver 8 and the latch member 9 on the door 7, in particular, adjacent to a first side 7*a* of the door 7, which is farthest from the rotation axis V. The arrangement of the latch assembly 6 at sides farthest from the rotation axis V allows the best possible feeling for the user when (by closing the door 7) the latch receiver 8 engages with the latch member 9.

In one example, the latch assembly 6 may have at least one of the latch receiver 8 and the latch member 9 arranged substantially at a corner 4*c* of the aperture 4. The corner 4*c* is a place wherein the first side 4*a* of the aperture 4 joins a second side 4*b* of the aperture 4, which is a lateral (left or right) side of the aperture 4 and is substantially perpendicular to the first side 4*a*. As such, the aperture 4 is substantially square or rectangular and includes: the first side 4*a* (e.g. the upper side, FIG. 9), the second side 4*b* (e.g. the left side, FIG. 9), a third side (e.g. the right side, FIG. 9) and a fourth side (e.g. the lower side, FIG. 9). Consequently, in this example, the door 7 includes the first side 7*a* (e.g. the upper side, FIG. 9), a second side 7*b* (e.g. the left side, FIG. 9), a third side 7*c* (e.g. the right side, FIG. 9) and a fourth side 7*d* (e.g. the lower side, FIG. 9). The first, second, third and fourth sides 7*a-d* of the door 7 substantially define a contour limit of a rectangular or square shape of the door 7. It may be noted that according to the present disclosure the terms "upper", "lower", "left" and "right" are referenced according to an observer looking to a front wall of the door 7.

Figure 3:
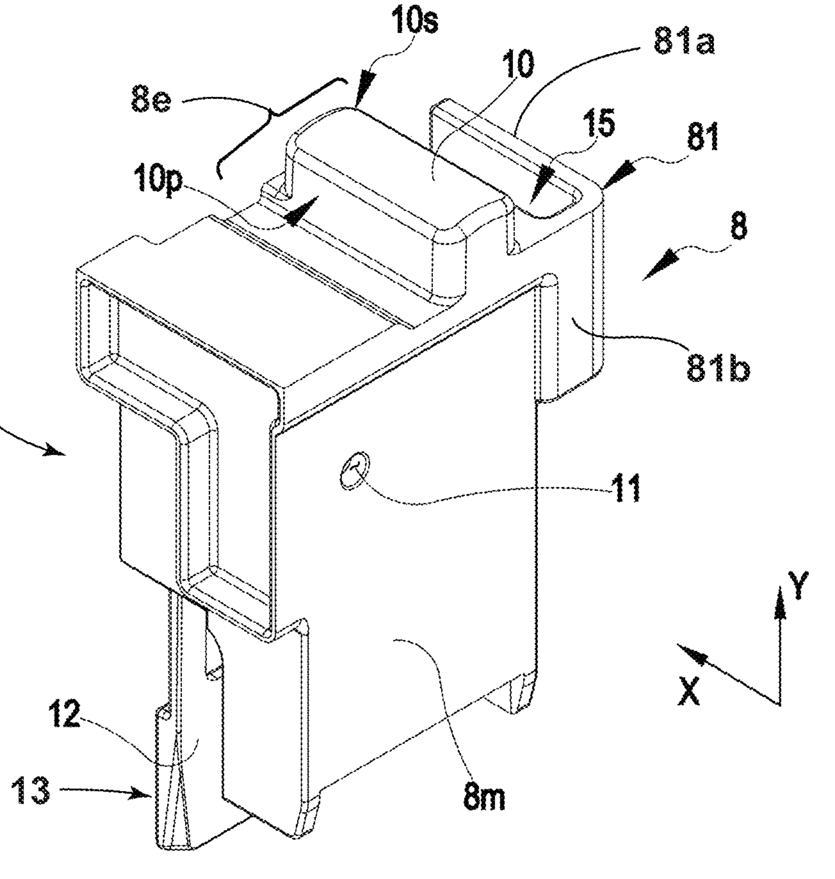
FIG. 3 is a top perspective view of a removable insert including a latch receiver according to various aspects described herein.

Referring now to FIGS. 2 and 3, the other of the latch receiver 8 and the latch member 9 may be integral to the insert 25 coupled to the door 7 and positioned adjacent to the first side of the door 7*a*. FIG. 2 illustrates the latch receiver 8 integral to the insert 25 coupled to the door 7. Similar to the first side 4*a* of the aperture 4, the first side 7*a* of the door 7 adjacent to the other one of the latch receiver 8 or the latch member 9 is coupled to may be the side which is farthest from the rotation axis V and may be a vertical or a horizontal side. It is noted that having the latch assembly 6 arranged near a top side helps clear space for consumer usability.

It is noted that the terms "adjacent to", when referring to the side of the door 7 farthest from the rotation axis V, describes that the respective component of the latch assembly 6 (i.e. the latch member 9 or the latch receiver 8) may be coupled i) to the side of the door 7 farthest from the rotation axis V (such an example being beneficial when the rotation axis V is horizontal as in FIG. 9, so that the respective component, e.g. the latch receiver 8, is applied to the side of the door 7 opposite to the side adjacent to the rotation axis V) or ii) to an end portion of a side of the door 7 contiguous to the side farthest from the rotation axis V (such an example being beneficial when the rotation axis V is vertical, as in FIG. 1, so that the respective component, e.g. the latch receiver 8, is applied to a side of the door 7 orthogonal and contiguous to the side adjacent to the rotation axis V and in proximity of the side of the door 7 opposite to the side adjacent to the rotation axis V).

Figure 5:
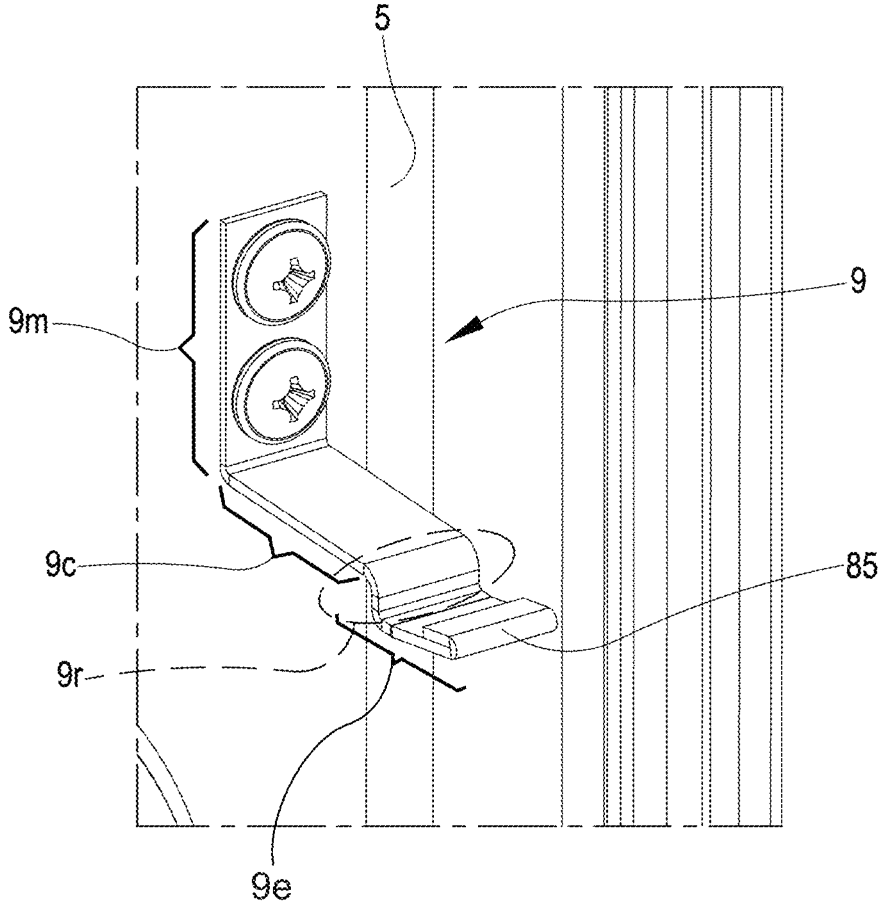
FIG. 5 is a side perspective view of the latch member of FIG. 4, illustrated in an installed position on the cooking appliance according to various aspects described herein.
Figure 7:
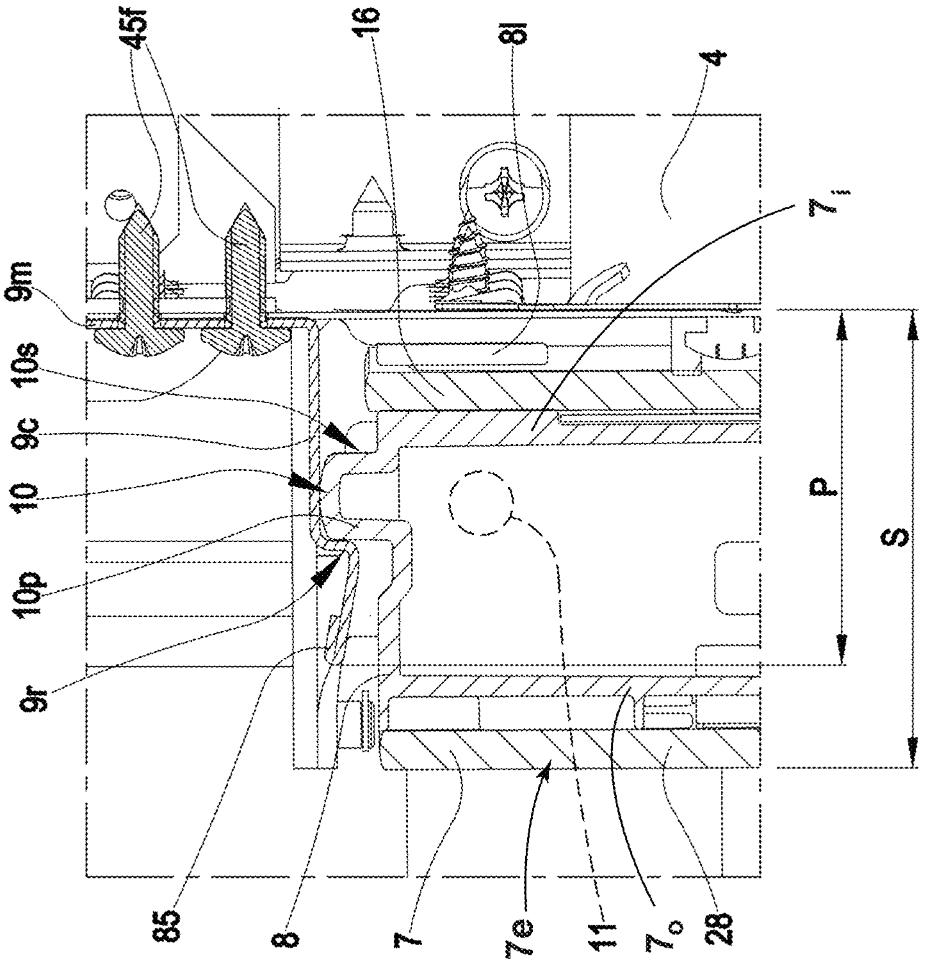
FIG. 7 is a side cross-sectional view of a portion of the cooking appliance of FIG. 1 illustrating the door arranged in a closed position according to various aspects described herein.

In one example, as shown in FIGS. 5, 7 and 8, the latch member 9 is coupled to the frame 5, while the latch receiver 8 is coupled to the door 7. In this configuration, the door 7 has the minimum amount of protruding parts, especially when the latch receiver 8 is small in size and does not protrude significantly from a body 7*e* of the door 7. As illustrated in at least FIG. 7, the latch assembly 6 does not extend beyond an outer wall 7*o* of the door 7. In another example, the latch member 9 is coupled to the door 7, while the latch receiver 8 is coupled to the frame 5.

Referring back to FIGS. 1 and 9, it may be noted that the first side 7*a* of the door 7 may be a horizontal side (e.g. either an upper side or a lower side) or a vertical side (e.g. either the left or the right side) of the door 7. As illustrated, the door is provided with a handle 77 that is configured to allow the latch member 9 to disengage from the latch receiver 8 when a pulling action is exerted on the handle 77. Providing the handle 77 close to the position of the latch member 9 and the latch receiver 8 produces a force, which is almost axial to the contrasting force that the latch receiver 8 exerts on the latch member 9 during use.

Figure 4:
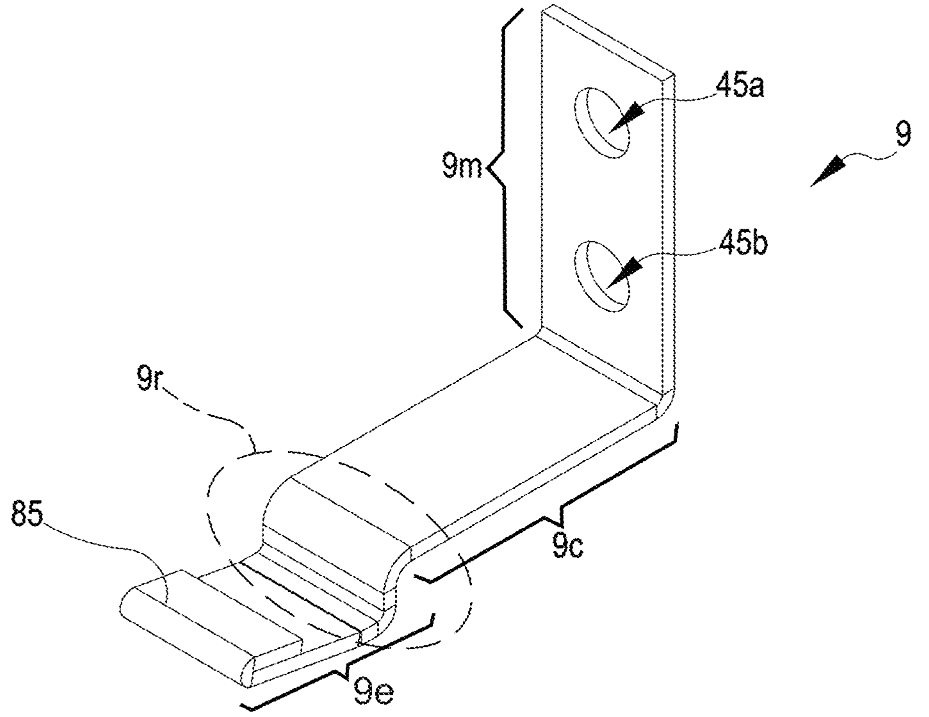
FIG. 4 is a side perspective view of a latch member according to various aspects described herein.

As illustrated in FIGS. 4 and 5, the engagement portion 9*e* of the latch member 9 is in the form of a cantilevered portion that is positioned at a distance from the frame 5 and includes the ridged portion 9*r*. The ridged portion 9*r* curves at least partly towards the door 7. In one example, the direction along which the ridged portion 9*r* curves is substantially inclined with respect to the rotation axis V of the door 7. Optionally, a distal portion, or tip 85, of the engagement portion 9*e* is rounded. The tip 85 may be formed by folding an end of the latch member 9. The end of the latch member 9 may be folded over the engagement portion 9*e* to form a smooth surface on the engagement portion 9*e* to engage the latch receiver 8.

Still referring to FIGS. 4 and 5, the latch member 9 may include a mounting portion 9*m* that is configured to be fastened to the frame 5 and allows the latch member 9 to be rigidly fastened to the frame 5. In one example, the mounting portion 9*m* is provided with at least one, and preferably two holes 45*a*, 45*b* configured to receive fasteners, or fixing screws 45*f* (FIG. 7). The fixing screws 45*f* pass through the thickness of the mounting portion 9*m* to fasten the latch member 9 to the body of the frame 5. The holes 45*a*, 45*b* form an anti-rotation feature with respect to the frame 5 (or door 7) to which the latch member 9 is fastened and, therefore, contribute to the stability of coupling of the latch member 9 to the frame 5 (or door 7). While the latch member 9 is described as being fixed to the frame 5 by screws, it is within the scope of the disclosure for the latch member 9 to be coupled to the cooking appliance 1 using any suitable technique, such as welding or gluing the latch member 9 to the frame 5. However, fastening the latch member 9 with the screws provides for easy replacement of the latch member 9 in the event that the latch member 9 is damaged.

Referring now to FIG. 4, between the ridged portion 9*r* and the mounting portion 9*m* the latch member 9 includes a connecting portion 9*c*, which may be substantially perpendicular to the mounting portion 9*m*. The purpose of the connecting portion 9*c* is to provide a separation of the ridged portion 9*r* from a wall of the frame 5, so that when the door 7 is in the closed position the latch receiver 8 is engaged in such a way that an inner wall 7*i* (FIG. 7) of the door 7 is substantially juxtaposed to the frame 5 surrounding the aperture 4 and the outer wall 7*o* of the door 7 is substantially planarly aligned to the outer body of the cooking appliance 1. The ridged portion 9*r* and the connecting portion 9*c* form a substantially stepped structure.

Turning now to FIG. 7, a distance, P, between the frame 5 and a point of the latch member 9 that is farthest from the frame 5 is less than the extension, S, of the first side 7*a* of the door 7 along a direction perpendicular to the frame 5. The distance, P, and the extension, S, are measured in a parallel direction which (in the example in FIG. 1 and also in the example in FIG. 9) is generally orthogonal to the direction of the rotation axis V. Because of distance, P, being less than extension, S, the latch member 9 remains substantially hidden from the user's view when the door 7 is in the closed configuration. Accordingly, the latch member 9 does not deter from the aesthetic appearance of the cooking appliance 1.

As illustrated in FIGS. 3 and 7, the engagement portion 8*e* of the latch receiver 8 includes the protrusion 10 having at least a first portion 10*p*, which acts as an abutment surface for the ridged portion 9*r* of the latch member 9 when the door 7 is in the closed position. As illustrated, the first portion 10*p* of the protrusion 10 is in the form of a wall of the protrusion 10 that is farthest from the frame 5. Further, the protrusion 10 includes a second portion 10*s* adjacent to the first portion 10*p*. The latch assembly 6 is configured such that a surface of the second portion 10*s* of the protrusion 10 acts as a cam surface for the ridged portion 9*r* of the latch member 9 during relative movement of the ridged portion 9*r* to the first portion 10*p* of the protrusion 10 and/or from the first portion 10*p* of the protrusion 10. When the door 7 is closed the first portion 10*p* of the protrusion 10, generally mates with the aforementioned stepped structure, including the ridged portion 9*r*.

In some aspects, the latch receiver 8 does not include recesses. Accordingly, the latch receiver 8 is not prone to accumulate dirt and cleaning of the latch receiver 8 is made remarkably easier. The latch receiver 8 may be formed of plastic, which may be a rigid plastic material. The latch receiver 8 may be a single, integral piece through an appropriate production process. This helps to reduce production costs for the latch receiver 8. In the case where the cooking appliance 1 is an oven, the plastic with which the latch receiver 8 is formed may be a heat-resistant, and optionally a flame retardant, plastic.

In some examples, in order to simplify the latch member 9, a strip of flexible material (preferably spring steel) may be used to form the mounting portion 9*m*, the connecting portion 9*c*, the ridged portion 9*r* and the tip 85 by appropriate bending. Accordingly, the strip of flexible material may be a single strip, which does not require welding or joining of several strips to produce the latch member 9. This also helps to reduce production costs for the latch member 9.

In use, when a user moves the door 7 from the open to the closed position, the latch member 9 contacts the latch receiver 8 at the tip 85 and the body of the latch member 9, in particular at least the connecting portion 9*c*, substantially flexes. As the door 7 approaches the frame 5, the protrusion 10 slides over (according to one example) the ridged portion 9*r* up into contact with the connecting portion 9*c* of the aforementioned stepped structure, including the ridged portion 9*r*. Thus, when the latch member 9 and the latch receiver 8 are joined together, a releasable engagement of the door 7 with the frame 5 is provided via an elastic deformation of at least one of a part of the latch member 9 or a part of the latch receiver 8. This deformation provides an arrangement between one of a part of the latch member 9 or a part of the latch receiver 8 in an unstable position that is held in place only by a small force, exerted at least temporarily, between the latch member 9 and the latch receiver 8. This deformation is passive and no active actuator is required.

Because of the flexibility of the latch member 9 and the stepped structure at the transition between the connecting portion 9*c* and the ridged portion 9*r*, the engagement between the latch member 9 and the latch receiver 8 (in particular the movement of the ridged portion 9*r* of the latch member 9 to get into contact with the first portion 10*p* of the protrusion 10 of the latch receiver 8) generates a perceptible "click" sound. The "click" sound is useful for providing the user with confirmation that the door 7 has been correctly closed.

Figure 6:
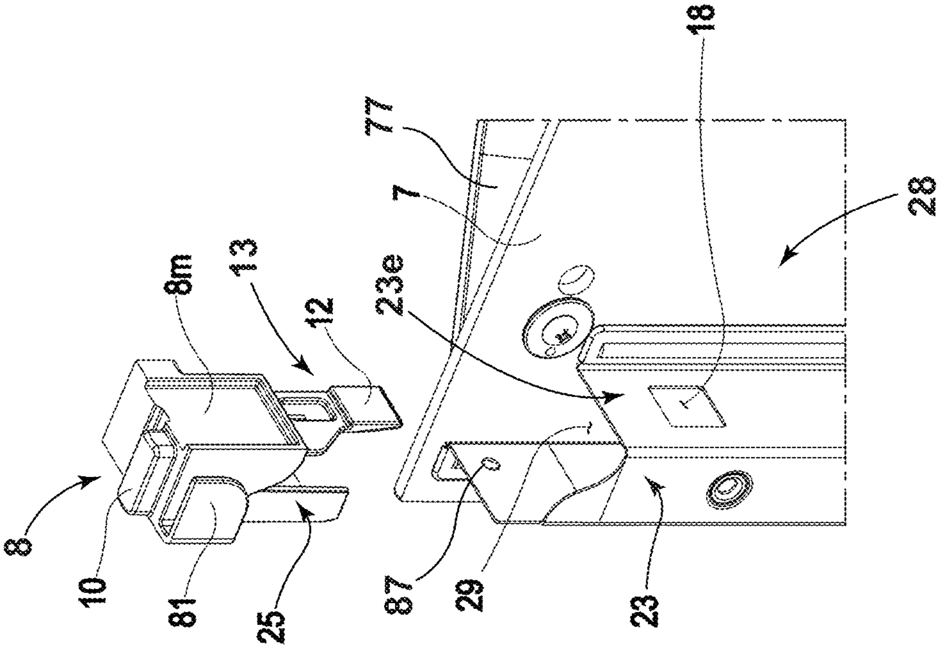
FIG. 6 is an exploded top perspective view of a portion of the door of the cooking appliance of FIG. 2 and the insert with the latch receiver of FIG. 3 according to various aspects described herein.

Referring to FIG. 6, in one example, the door 7 of the cooking appliance 1 includes a structural element 23 which extends longitudinally along a vertical side of the door 7, i.e. along the first side 7*a* of the door 7 (as in the example in FIG. 1) or along the second side 7*b* of the door 7 adjacent to the first side 7*a* of the door 7 (as in the example in FIG. 9). The structural element 23 forms a mullion which may be used for fixing the internal glass 16 to the door 7. In some examples, the structural element 23 is glued on the inner surface of the external glass 28. The cooking appliance 1 may include two structural elements 23 which are positioned in close proximity to the vertical sides of the door 7 to allow the internal glass 16 to be supported at both ends.

The insert 25 is secured, which may be removably secured, to the structural element 23 of the door 7. This helps to ease and speed-up the production process of the cooking appliance 1 when the latch assembly 6 is mounted. Further, should it be necessary, the insert 25 allows for easy replacement of the latch receiver 8.

To removably couple the insert 25 to the door 7, the cooking appliance 1 may include the snap coupler 13 which is operative between the insert 25 and the structural element 23. The snap coupler 13 is configured to secure the insert 25 to the structural element 23 upon vertical displacement of the insert 25 (i.e. following a displacement parallel to the first side of the door 7 when the rotation axis V is vertical as in FIG. 1 or following a displacement orthogonal to the first side of the door 7 and parallel to the second side of the door 7 when the rotation axis V is horizontal as in FIG. 9). In the embodiment according to the FIG. 6, the snap coupler 13 is part of the latch receiver 8.

The snap coupler 13 may include a tab, or flap 12, integral to the insert 25. An opening 18 may be defined in the structural element 23. As illustrated in FIG. 6, the opening 18 includes a rectangular or square shape and the flap 12 of the insert 25 includes a corresponding shape configured to be received within the opening 18. In this way, the snap coupler 13 may secure the insert 25 to the structural element 23 upon displacement of the insert 25. The insert 25 may define a hole 11 (in particular a through hole) for accommodating a fixing screw that assembles the insert 25 (therefore the latch receiver 8) to the structural element 23. However, the insert 25 may be fixed to the structural element 23 in any suitable manner. The fixing screw provides a stable engagement between the insert 25 and the structural element 23.

Referring now to FIGS. 2 and 3, the insert 25 may include a groove 15 that accommodates an edge 16*e* of the internal glass 16 of the door 7. The groove 15 receives the latch member 9 and also secures the internal glass 16 using a single component (the groove 15) of the cooking appliance 1. In some examples, the groove 15 is manufactured in a single molded plastic piece. As illustrated, the flap 12 protrudes outwardly from a main portion 8*m* of the body of the insert 25. The spatial arrangement of the groove 15 is well represented in FIG. 3, which includes a vertical reference axis Y and a horizontal reference axis X, which is orthogonal to the vertical reference axis Y. The groove 15 forms an "L"-shaped wall 81, which protrudes laterally from the main portion 8*m* of the body and assumes the form of a thin slit having main extension directions that include a plane X-Y, which, in turn, include the two reference axes X, Y. The "L"-shaped wall 81 includes a first, longer, wall 81*a* and a second, shorter, wall 81*b*. The second, shorter, wall 81*b* may directly connect to the main portion 8*m* of the body thereby forming a stopping wall 83 for retaining the internal glass 16 of the door 7.

Still referring to FIGS. 2 and 3, the hole 11 is defined on the insert 25 at a height at which a corresponding hole 87 (FIG. 6) arranged on the structural element 23 is defined, in order to allow a screw to pass through the thickness of a wall of the structural element 23 before contacting the insert 25 and entering the hole 11. In other words, the hole 11 of the insert 25 and the corresponding hole 87 arranged on the structural element 23 are at a same height. In a process of assembling the cooking appliance 1, a step may include forming the hole 87 in the structural element 23 and the hole 11 on the insert 25 arranged at corresponding positions so that when the insert 25 is introduced in the structural element 23, the hole 87 in the structural element 23 and the hole 11 on the insert 25 are positioned at a same height and a single screw may simultaneously pass through each hole 11, 87. Thus, the insert 25 and the latch receiver 8 may be fixed to the door 7 by simultaneous engagement of two different connection elements both configured to releasably connect to the door 7. The securing provided by the fixing screw may be considered auxiliary with respect to the securing provided by the snap coupler 13 with the opening 18. In some examples, the hierarchical order of the coupling may be the other way around, i.e. the securing provided by the snap coupler 13 with the opening 18 may be auxiliary with respect to the securing provided by the fixing screw.

Referring again to FIG. 6, the structural element 23 is provided with a recess 29 to receive at least a portion of the insert 25. The insert 25 may be removably mounted to the structural element 23 via displacement in a vertical direction (in a direction parallel to the rotation axis V in the embodiment of FIG. 1 or in a direction orthogonal to the rotation axis V in the embodiment of FIG. 9), downwardly.

As illustrated, the structural element 23 has a semi-boxed, or "C"-shaped, profile and the recess 29 extends for at least a portion of, or the entire length of the structural element 23. FIG. 6 illustrates the structural element 23 having three main lateral walls and the opening 18 is arranged in one of said walls. The insert 25 may be configured so that the flap 12 is housed into the recess 29 formed by the semi-boxed, or "C"-shaped profile of the structural element 23. The structural element 23 may have a variety of configurations that may receive at least a portion of the insert 25. For instance, the structural element 23 may have a semicircular shape. In some examples, the structural element 23 is formed with a single metal sheet, and the profile of the structural element 23 is formed by appropriately bending and cutting the metal sheet.

Still referring to FIG. 6, the opening 18 may be positioned proximate an end 23*e* of the structural element 23. When the cooking appliance 1 is manufactured, the insert 25 enters the recess 29 of the structural element 23 via an axial sliding movement and the snap coupler 13 flexes as the flap 12 is forced against a lateral wall of the structural element 23 while sliding against the wall of the structural element 23 until the flap 12 engages the opening 18. Then, the snap coupler 13 is no longer in a flexed state, or the flex is substantially reduced. The corresponding shapes of the flap 12 and of the opening 18 provide a secure connection between the insert 25 and the structural element 23. In this way, at least a portion of the flap 12 is inserted and disposed within the opening 18. Insertion of the flap 12 into the opening 18 occurs when the flap 12 is moved relative to the opening 18, which takes place in a direction that may be orthogonal to the rotation axis V (in the embodiment of FIG. 1) or in a direction parallel to the rotation axis V (in the embodiment of FIG. 9). Then, a screw may be introduced in the screw hole 11 for completing a mounting operation of the insert 25 on the structural element 23.

In some examples, the latch assembly 6 may include an additional latch member 90 (illustrated in FIG. 1), and hence a further latch head and/or a further latch receiver 80 (illustrated in FIG. 9) (advantageously such an additional latch member 90 being identical or specular in structure to the latch member 9 described herein). In particular, from FIGS. 1 and 9, it may be appreciated that when the rotation axis V of the door 7 is vertical (see FIG. 1), the additional latch assembly (including the additional latch member 90 and related additional latch receiver 80) may be positioned adjacent to the first side 7*a* of the door 7 (i.e. adjacent to the vertical side of the door 7 and opposite to the side of the door 7 adjacent to the rotation axis V), but at the corner between the first side 7*a* of the door 7 and the fourth side 7*d* of the door 7 (the fourth side 7*d* of the door 7 being, in the example of FIG. 1, the lower side of the door 7). In particular, the latch assemblies 6 may be equally spaced from the vertical rotation axis V. In some examples, the inserts with the latch receivers 8, 80 are installed at opposite ends of the same structural element 23. When the rotation axis V of the door 7 is horizontal (see FIG. 9) the additional latch assembly (including the additional latch receiver 80 and related additional latch member 90) may be positioned adjacent to the first side 7*a* of the door 7 (i.e. adjacently to the upper side of the door 7), but at the corner between the first side 7*a* of the door 7 and the third side 7*c* of the door 7 (the third side 7*c* of the door 7 being, in the example of FIG. 9, the lateral side of the door 7 opposite to the second side of the door 7, i.e. opposite to the side of the door 7 adjacent to the other latch assembly). In some examples, the latch assemblies 6 are equally spaced from the respective adjacent lateral side of the door 7. The inserts 25 with the latch receivers 8, 80 may be on distinct structural elements 23, each insert 25 being installed at the upper end of the respective structural element 23.

Benefits of various aspects described herein may include a latch assembly 6 that provides a user with a clear, perceptible feedback signal informing the user that the door 7 has been correctly closed. The latch assembly according to various aspects described herein reduces hassle since the latch assembly does not interfere with loading and unloading operations. The latch assembly according to the present disclosure is easy to clean and does not deter from the aesthetic appearance of the cooking appliance 1.

In addition, the latch assembly 6 according to various aspects described herein may be employed on a wide variety of sizes and types of appliances, from small to large, without any substantial adaptation. Also, the position at which the latch member 9 and the latch receiver 8 are mounted is independent of an aspect ratio of the cooking cavity 3. However, a technician or expert in the art may modify the size and/or location of the latch assembly 6. For example, the thickness of the metal sheet which forms the latch member 9 may be selected to obtain a desired contrasting force when the protrusion 10 slides on the latch member 9 up to the ridged portion 9*r*. In another example, the protrusion 10 may include chamfering or filleting on any portion thereof to adjust the sliding movement.

An object of the present disclosure is to provide a cooking appliance having a latch assembly arranged to establish a releasable engagement between a frame and a door of the cooking appliance which aids in the prevention of heat losses from the cooking cavity.

A further object of the present disclosure is to provide a cooking appliance having a latch assembly configured to provide the user with a clearly perceptible feedback signal informing the user that the door has been correctly closed.

A further object of the present disclosure is to provide a cooking appliance which allows consumers to use an oven without hassle. In particular, the cooking appliance is intended to be free of encumbrances which could interfere with the loading and unloading operations.

A further object of the present disclosure is to provide a cooking appliance having a latch assembly that is simple and cost-effective to produce. Moreover, the latch assembly may be exploited for fastening components (in particular a glass pane) to the door structure.

A further object of the present disclosure is to provide a cooking appliance having a latch assembly with a clean, pleasant aspect, which does not deter from the overall aspect of the cooking appliance even when the door is open.

A further object of the present disclosure is to provide a cooking appliance having a latch assembly that is easy to clean.

A further object of the present disclosure is to provide a cooking appliance with a latch assembly which does not require an external power source in order to operate.

A further object of the present disclosure is to describe a method for assembling a cooking appliance, which may be in the form of an oven, enables cost effective production of the cooking appliances.

According to a first aspect a cooking appliance is disclosed; said cooking appliance, which in particular is an oven 1 or a range, includes: at least a muffle 2 defining a cooking cavity 3; a frame 5, an aperture 4 being provided in said frame for gaining access to the cooking cavity; a door 7 hinged to said frame 5, the door 7 allowing said aperture 4 to be selectively opened and closed by means of a rotation of the door 7 around a rotation axis V; a latch assembly configured to establish a releasable engagement between said frame 5 and said door 7 when said door 7 is in the closed position, wherein said latch assembly includes at least a latch member 9 and at least a latch receiver 8 having respective engagement portions, wherein one between said latch member 9 and said latch receiver 8 is applied to said frame 5 adjacently to a first side of said aperture 4, the first side of said aperture 4 being the side of said aperture 4 farthest from said rotation axis V, wherein the other between said latch member 9 and said latch receiver 8 is integral to an insert 25 coupled to the door 7 and is applied adjacently to a first side of the door 7, the first side of the door 7 being the side of said door 7 farthest from said rotation axis V.

According to the present invention, it is further realized a latch assembly for a cooking appliance, said latch assembly being configured to establish a releasable engagement between a frame 5 of the cooking appliance and a door 7 of the cooking appliance when said door 7 is in the closed position, wherein the latch assembly 8, 9 includes at least a latch member 9 and at least a latch receiver 8 having respective engagement portions, wherein one between said latch member 9 and said latch receiver 8 is configured to be applied to said frame 5 adjacently to a first side of an aperture 4 of the cooking cavity of said cooking appliance, the first side of said aperture 4 being the side of said aperture 4 farthest from a rotation axis V of said door 7, wherein the other between said latch member 9 and said latch receiver 8 is configured to be integral to an insert 25 coupled to the door 7 and is applied adjacently to a first side of the door 7, the first side of the door 7 being the side of said door 7 farthest from said rotation axis V.

The cooking appliance and the latch assembly according to the aforementioned aspects have several further features which are disclosed in the subsequent aspects. Said aspects may be combined together in any suitable form, and may be further combined with technical features, which are disclosed in the subsequent chapter concerning the detailed description of the invention.

According to a further non-limiting aspect, the latch member 9 is applied to said frame 5 and said latch receiver 8 is applied to the door 7.

According to a further non-limiting aspect, the latch receiver 8 is applied to the first side of the door 7.

According to a further non-limiting aspect, the engagement portion of said latch member 9 is a cantilevered portion positioned at a distance from said frame 5 and includes a ridged portion **9*r* developing at least partly towards said door 7**.

According to a further non-limiting aspect, said engagement portion further includes a rounded tip 85 obtained in particular by folding an end of said latch member 9.

According to a further non-limiting aspect, said latch member 9 further includes a mounting portion **9*m* allowing said latch member 9 to be fastened to said frame 5**.

According to a further non-limiting aspect, at least two holes **45*a*, 45*b* are provided in said mounting portion 9*m*** for accommodating fixing screws.

According to a further non-limiting aspect, the latch member 9 further includes a connecting portion **9*c* extending from said mounting portion 9*m* to said ridged portion 9*r***.

According to a further non-limiting aspect, said connecting portion **9*c* is substantially perpendicular to said mounting portion 9*m***.

According to a further non-limiting aspect, the engagement portion of said latch receiver 8 includes a protrusion 10 developing at least partly away from said rotation axis V and wherein said latch assembly is configured so that the surface of a first portion **10*p* of said protrusion 10 acts as an abutment surface for the ridged portion 9*r* of said latch member 9 when said door 7** is in the closed position.

According to a further non-limiting aspect, the first portion **10*p* of said protrusion 10 includes the wall of said protrusion 10 farthest from said frame 5**.

According to a further non-limiting aspect, the protrusion 10 further includes a second portion **10*s* adjacent to the first portion 10*p* and wherein said latch assembly is configured so that the surface of the second portion 10*s* of said protrusion 10 acts as a cam surface for the ridged portion 9*r* of said latch member 9 during the relative movement of said ridged portion 9*r* to the first portion 10*p* of said protrusion 10 and/or from the first portion 10*p* of said protrusion 10**.

According to a further non-limiting aspect, said door 7 includes a structural element 23 extending longitudinally along a second side of the door 7 adjacent to the first side of the door 7 and wherein said insert 25 is secured to said structural element 23.

According to a further non-limiting aspect, the insert 25 is removably secured to the structural element 23.

According to a further non-limiting aspect, the latch assembly is a passive latch assembly.

According to a further non-limiting aspect, the insert 25 is configured to be slidably inserted, at least partially, into the structural element 23.

According to a further non-limiting aspect, the structural element 23 is provided and/or defines at least one recess into which the insert 25 can be introduced by means of a sliding.

According to a further non-limiting aspect, the sliding is an axial sliding and, optionally, is orthogonal to the rotation axis V, said option applying mainly when the rotation axis V is substantially horizontal.

According to a further non-limiting aspect, said door 7 further includes a snap coupler operative between said insert 25 and said structural element 23, said snap coupler being configured for having said insert 25 secured to said structural element 23 following a displacement of said insert 25 parallel to said second side of the door 7.

According to a further non-limiting aspect, said snap coupler includes a flap 12 integral to said insert 25 and an opening 18 provided in said structural element 23.

According to a further non-limiting aspect, said insert 25 includes at least one hole 11 for accommodating a fixing screw connecting said insert 25 to said structural element 23.

According to a further non-limiting aspect, the insert 25 includes a groove 15 for accommodating an edge of a glass 16 of said door 7.

According to a further non-limiting aspect, the groove 15 includes first and a second main extension directions, wherein at least one of the first and second main extension directions is parallel to the rotation axis V.

According to a further non-limiting aspect, the body of the latch receiver 8 includes a main portion 8*m* and an "L"-shaped wall 81 which protrudes laterally from the main portion 8*m*.

According to a further non-limiting aspect, the "L"-shaped wall 81, together with the main portion 8*m* of the body realize said groove 15. As a matter of fact, the "L"-shaped wall 81 forms a sort of pocket accommodating a corner of the internal wall 16 of the door 7. The "L"-shaped wall may comprise a first, longer, wall and a second, shorter, wall. At least one of the first, longer, wall and the second, shorter, wall may realize a stopping wall for retaining the glass of the door 7.

According to a further non-limiting aspect, the structural element 23 includes a hole, said hole being configured to match with the hole 11 of the insert 25 so that to make the fixing screw pass the thickness of at least one wall of the structural element 23 through said hole before entering the hole 11 thereby contacting the insert 25.

According to a further non-limiting aspect, the flap 12 is flexible.

According to a further non-limiting aspect, the flap 12 protrudes outwardly from a main body of the insert 25.

According to a further non-limiting aspect, the insert 25 is a single piece, optionally plastic, element.

According to a further non-limiting aspect, the flap 12 is configured to be introduced into the structural element 23.

According to a further non-limiting aspect, the structural element 23 is a metal element.

According to a further non-limiting aspect, the structural element 23 has a semi-boxed profile or a "C"-shaped profile.

According to a further non-limiting aspect, the flap 12 is configured to be housed into the semi-boxed or "C"-shaped profile of the structural element 23.

According to a further non-limiting aspect, the structural element 23 has a longitudinal extension or main direction of extension which is orthogonal to said rotation axis V. In such an aspect, mainly when the rotation axis V is substantially horizontal, the hole 11 is configured to make the screw be aligned in a direction which is substantially parallel to the direction along which the rotation axis V is aligned.

According to a further non-limiting aspect, the fixing screw is configured to impede the separation of the insert 25 from the structural element 23, at least when being introduced into the hole 11.

According to a further non-limiting aspect, the structural element 23 is juxtaposed and/or rigidly fixed to a door 7 wall, and its semi-boxed profile or "C" shaped profile defines a recess which extends at for at least a part of the longitudinal extension or main direction of extension.

According to a further non-limiting aspect, the recess extends for the entire longitudinal extension or main direction of extension of the structural element 23.

According to a further non-limiting aspect, the structural element 23 is realized from a single sheet of metal, in particular is realized from a sheet of metal bent so as to realize the semi-boxed structure.

According to a further non-limiting aspect, the structural element 23 is provided with a first end portion and a second end portion, optionally opposite to the first end portion; the opening 18 being realized substantially at one of said first or second end portions.

According to a further non-limiting aspect, the distance P between said frame 5 and the point of said latch member 9 farthest from said frame 5 is lower than the extension S of the first side of the door 7 along a direction perpendicular to said frame 5.

This aspect allows the latch member 9 to remain hidden from view in a closed configuration of said door 7.

According to a further non-limiting aspect, said latch member 9 is made of a strip of a flexible material, in particular spring steel.

According to a further non-limiting aspect, said latch receiver 8 is made of a body of a rigid material, in particular plastic material.

According to a further non-limiting aspect, said latch member 9 and/or said latch receiver 8 are made in one piece.

According to a further non-limiting aspect, the first side of the door 7 is a horizontal side, in particular an upper side or a lower side.

According to a further non-limiting aspect, the first side of the door 7 is a vertical side of said door 7.

According to a further non-limiting aspect, said door 7 includes a handle 77 mounted in the proximity of the first side of the door 7 and configured to allow said latch member 9 to be disengaged from said latch receiver 8 by exerting a pulling action on said handle 77.

According to a further non-limiting aspect, the first side of said aperture 4 is the upper side of said aperture 4 and the first side of the door 7 is the upper side of the door 7, i.e. the wall of the door 7 adjacent to the top portion of the front wall of the door 7, wherein said latch member 9 is applied to said frame 5 in proximity of a second side of said aperture 4, the first side of said aperture 4 and the second side of said aperture 4 being substantially perpendicular to each other.

According to a further non-limiting aspect, the latch assembly includes a further latch member and a further latch receiver, said further latch member being applied to said frame 5 adjacently to the first side of said aperture 4 and said further latch receiver being applied to the first side of the door 7, said further latch member being applied to said frame 5 in proximity of a third side of said aperture 4, the second side of said aperture 4 and the third side of said aperture 4 being opposite to each other.

According to the present invention, a method for assembling a cooking appliance which in particular is an oven 1 or a range is disclosed. The cooking appliance once assembled includes: at least a muffle 2 defining a cooking cavity 3; a frame 5, an aperture 4 being provided in said frame for gaining access to the cooking cavity; a door 7 hinged to said frame 5, the door 7 allowing said aperture 4 to be selectively opened and closed by means of a rotation of the door 7 around a rotation axis V; a latch assembly configured to establish a releasable engagement between said frame 5 and said door 7 when said door 7 is in the closed position, said latch assembly comprising at least a latch member 9 and at least a latch receiver 8 having respective engagement portions.

The method according to the invention includes the steps of: installing and/or applying one between said latch member 9 and said latch receiver 8 on said frame 5 adjacently to a first side of said aperture 4, the first side of said aperture 4 being the side of said aperture 4 farthest from said rotation axis V, installing and/or applying the other between said latch member 9 and said latch receiver 8, which is integral to an insert 25 coupled to the door 7, adjacently to a first side of the door 7, the first side of the door 7 being the side of said door 7 farthest from said rotation axis V.

According to a further non-limiting aspect, the method includes installing and/or applying the latch member 9 on said frame 5 and the latch receiver 8 on the door 7.

According to a further non-limiting aspect, the method includes installing and/or applying the latch member 9 and the latch receiver 8 to the respective frame 5 and door 7 so that during a door 7 closure by means of a rotation thereof around the rotation axis V an engagement portion of the latch member 9 engages the latch receiver 8 at a protrusion 10 thereof. Advantageously, the latch member develops at least partly away from said rotation axis V. During the engagement, the latch member 9 flexes and releasably retains the latch receiver 8 at a ridged portion 9*r* developing at least partly towards said door 7.

According to a further non-limiting aspect, installing and/or applying the latch member 9 includes fastening the latch member 9 to the frame 5 or to the door 7 at a mounting portion 9*m* of the latch member 9, through at least two fixing screws 45*f* passing through respective holes 45*a*, 45*b* of the mounting portion 9*m*.

According to a further non-limiting aspect, when the engagement portion of the latch member 9 engages the latch receiver 8 at a protrusion thereof, the surface of a first portion 10*p* of said protrusion 10 acts as an abutment surface for the ridged portion 9*r* of said latch member 9 when said door 7 is in the closed position, the first portion 10*p* of said protrusion 10 comprising in particular the wall of said protrusion 10 farthest from said frame 5.

According to a further non-limiting aspect, the method includes installing the latch receiver 8 on the door 7 by performing a step at which an insert 25 integral to the latch receiver 8 is secured, optionally removably secured, to a structural element 23, optionally to a structural element 23 extending longitudinally along a second side of the door 7 adjacent to the first side of the door 7.

According to a further non-limiting aspect, the securing includes making the insert 25 slide with respect to the structural element 23 up to a position at which a snap coupler comprising in particular a flap 12 integral to said insert 25 releasably engages an opening 18 provided in said structural element 23.

According to a further non-limiting aspect, the securing includes fixing the insert 25 to the structural element 23 through a fixing screw engaging, at least in one specific operative condition, both the structural element 23 and a hole 11 practiced on a body of the latch receiver 8.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:

a muffle defining a cooking cavity;

a frame defining an aperture accessing the cooking cavity;

a door configured to selectively cover the aperture by rotation of the door around a rotation axis, the door including a structural element extending longitudinally along a side of the door, wherein the structural element forms a mullion between a pair of glass panes; and a latch assembly configured to establish a releasable engagement between the frame and the door, the latch assembly comprising:

a latch member including an engagement portion having a ridged portion;

a latch receiver including a protrusion; and an insert directly coupled to the structural element of the door, the insert including a snap coupler configured to secure the insert to the structural element, wherein one of the latch member and the latch receiver is integral to the insert and the insert is configured to receive an edge of an internal glass of the pair of glass panes.

2. The cooking appliance according to claim 1, wherein the latch member is coupled to the frame and the latch receiver is coupled to the door.

3. The cooking appliance according to claim 2, wherein the engagement portion of the latch member is a cantilevered portion positioned at a distance from the frame and the ridged portion curves at least partly towards the door.

4. The cooking appliance according to claim 2, wherein the latch member further includes a mounting portion configured to be fastened to the frame, the mounting portion including at least one hole configured to receive a fastener.

5. The cooking appliance according to claim 4, wherein the latch member further includes a connecting portion extending from the mounting portion to the ridged portion, the connecting portion substantially perpendicular to the mounting portion.

6. The cooking appliance according to claim 1, wherein the protrusion of the latch receiver includes a first portion which acts as an abutment surface for the ridged portion of the latch member when said door is in a closed position, the first portion of the protrusion in the form of a wall of the protrusion farthest from the frame.

7. The cooking appliance according to claim 6, wherein the protrusion further includes a second portion adjacent to the first portion which acts as a cam surface for the ridged portion of the latch member during a relative movement of the ridged portion to the first portion of the protrusion and/or from the first portion of the protrusion.

8. The cooking appliance according to claim 1, wherein the snap coupler is operative between the insert and the structural element, the snap coupler comprising:

a flap integral to the insert, wherein an opening is defined in said structural element, the opening configured to receive the flap such that the snap coupler secures the insert to the structural element upon vertical displacement of the insert.

9. The cooking appliance according to claim 1, wherein the latch member is made of a strip of a flexible spring steel and the latch receiver is made of a body of a plastic material.

10. The cooking appliance according to claim 1, wherein the latch member is a single piece and the latch receiver is a single piece.

11. The cooking appliance according to claim 1, wherein said latch assembly includes an additional latch member and an additional latch receiver, the additional latch member coupled to the frame and the additional latch receiver being coupled to the frame on a side of the door opposite to the side of the door adjacent the other latch assembly.

12. A cooking appliance, comprising:

a muffle defining a cooking cavity;

a frame defining an aperture accessing the cooking cavity;

a door configured to selectively cover the aperture by rotation of the door around a rotation axis, the door including a structural element extending longitudinally along a side of the door, wherein the structural element forms a mullion between a pair of panes; and a latch assembly configured to establish a releasable engagement between the frame and the door, the latch assembly comprising:

a flexible latch member including an engagement portion having a ridged portion;

a latch receiver including a protrusion, wherein one of the latch member and the latch receiver is coupled to the door and the other one of the latch member and the latch receiver is coupled to the frame and the latch assembly does not extend beyond an outer wall of the door; and an insert directly coupled to the structural element of the door, wherein the one of the latch member and the latch receiver coupled to the door is coupled to the insert and the insert is configured to receive an edge of an internal pane of the pair of panes.

13. The cooking appliance according to claim 12, wherein the insert is removably coupled to the door and includes a snap coupler configured to secure the insert to the door.

14. The cooking appliance according to claim 13, wherein the snap coupler is operative between the insert and the structural element.

15. The cooking appliance according to claim 12, wherein the protrusion of the latch receiver includes a first portion which acts as an abutment surface for the ridged portion of the latch member when said door is in a closed position.

16. The cooking appliance according to claim 12, wherein when the door is in a closed position the protrusion of the latch receiver generally mates with the ridged portion of the latch member.

17. A method of installing a latch assembly on a cooking appliance comprising the steps of:

installing one of a latch member and a latch receiver on a frame adjacent to a side of an access opening farthest from a rotation axis; and installing the other one of the latch member and the latch receiver on a door, the other one of the latch member and the latch receiver being integral to an insert removably coupled to the door, adjacent to a side of the door farthest from the rotation axis, wherein installing the other one of the latch member and the latch receiver on the door includes displacement of the insert until a flap on the insert is received within an opening in a structural element of the door, the structural element extending longitudinally along a side of the door, wherein the structural element forms a mullion between a pair of panes and the insert receives an edge of an internal pane of the pair of panes.

18. The method of installing a latch assembly on a cooking appliance of claim 17, further comprising the step of:

forming the structural element by bending and cutting a single metal sheet.

19. The method of installing a latch assembly on a cooking appliance of claim 17, further comprising the step of:

forming a mounting portion, a connecting portion, a ridged portion, and a tip on the latch member by bending a single strip of flexible material.

* * * * *